US012256745B2

(12) United States Patent
Wei et al.

(10) Patent No.: US 12,256,745 B2
(45) Date of Patent: Mar. 25, 2025

(54) DEVICE AND METHOD FOR ELECTRIC SLAUGHTERING TORTOISES

(71) Applicant: Yangzhou University, Yangzhou (CN)

(72) Inventors: Wenzhi Wei, Yangzhou (CN); Chunyu Chen, Yangzhou (CN); Zhengcheng Wang, Yangzhou (CN)

(73) Assignee: Yangzhou University, Yangzhou (CN)

( * ) Notice: Subject to any disclaimer, the term of this patent is extended or adjusted under 35 U.S.C. 154(b) by 35 days.

(21) Appl. No.: 18/495,759

(22) Filed: Oct. 27, 2023

(65) Prior Publication Data

US 2024/0138424 A1    May 2, 2024

(30) Foreign Application Priority Data

Oct. 28, 2022  (CN) .......................... 202211334182.7

(51) Int. Cl.
*A22B 3/00* (2006.01)
*A22B 3/06* (2006.01)

(52) U.S. Cl.
CPC ...................................... *A22B 3/06* (2013.01)

(58) Field of Classification Search
CPC ................ A22B 1/00; A22B 3/06; A22B 3/10
USPC .......................................................... 452/52
See application file for complete search history.

(56) References Cited

U.S. PATENT DOCUMENTS

| | | | | |
|---|---|---|---|---|
| 4,406,036 A | * | 9/1983 | Nijhuis | A22B 1/00 452/53 |
| 4,694,534 A | * | 9/1987 | Simmons | A22B 3/06 452/59 |
| 7,740,527 B1 | * | 6/2010 | Harben | A22B 3/06 452/58 |
| 2018/0317504 A1 | * | 11/2018 | Airey | A22B 3/06 |

* cited by examiner

*Primary Examiner* — Richard T Price, Jr.
(74) *Attorney, Agent, or Firm* — Hemisphere Law, PLLC; Zhigang Ma

(57) ABSTRACT

A tortoise electric slaughtering device includes an electric slaughtering box, an end of the box is disposed with an outlet, a bottom wall of another end thereof is disposed with a concave area, and a discharging plate is mounted at the outlet. The box is supported on a ground through a frame, and a bottom of the box and an upper surface of the frame have a gap therebetween. A driving wheel rotatably disposed between side walls at one end of the box, a driven wheel rotatably mounted on an end of the frame away from the driving wheel, deflector rollers mounted in a slope direction between side walls of the box at the concave area, and a guiding roller mounted on the box and near the driven wheel, are connected through a conveyer belt. A clamping device is mounted on the box and mounted with a cutting device.

8 Claims, 2 Drawing Sheets

DEVICE AND METHOD FOR ELECTRIC SLAUGHTERING TORTOISES

CROSS-REFERENCE TO RELATED APPLICATION

This application claims priority to Chinese Patent Application No. 202211334182.7, filed on Oct. 28, 2022, the disclosure of which is incorporated herein by reference in its entirety.

TECHNICAL FIELD

The invention relates to the field of slaughtering devices, and particularly to a device and a method for electric slaughtering tortoises.

BACKGROUND

The tortoise-shell glue is a solid glue made by water decocting carapaces and plastrons of tortoises in the turtle family and then concentrating, its main ingredients are collagen, fat, calcium, phosphorus, peptides, various enzymes, and various essential trace elements for the human body, and it is also rich in various amino acids such as aspartic acid, threonine, and serine. The tortoise-shell glue is a precious traditional Chinese medicine in China and has been recorded in various editions of the Chinese Pharmacopoeia. The tortoise-shell glue is cool in nature, salty and sweet in taste, passes through liver, kidney and heart channels, has effects of regulating body functions, enhancing immunity and prolonging life, and is mainly used for treating symptoms such as yin-deficiency hot flashes, lumbar debility, blood-deficiency chlorosis, hectic fever and night sweat, and uterine bleeding and morbid leukorrhea. The modern pharmacology shows that the tortoise-shell glue also has functions such as inhibiting tumors, treating gastric ulcers, enriching blood and stopping bleeding, treating chronic glomerulonephritis, increasing white blood cells, preventing and treating chronic cough and asthma, and intermenstrual bleeding.

The tortoise-shell glue is mainly prepared by steps such as slaughtering tortoises, processing tortoise-shells, decocting the processed tortoise-shells in water, concentrating into glue, and then cutting into pieces and drying. At present, there are many preparation techniques focused on the optimization of processes such as removing carrion from tortoise-shells, and decocting times. The first step of the preparation is slaughtering the tortoise, and a manual living slaughter method is still employed. The tortoise-shells are hard, resulting in the slaughtering is difficult and thus more labor force is needed. In addition, such method is cruel and does not conform to the spirit of animal welfare. Therefore, there is an urgent need for a highly automated, and easy to operate and humane device.

SUMMARY

A purpose of the invention is to provide a tortoise electric slaughtering device, which is simple to operate and convenient to use, so as to overcome the defects of manual slaughter being difficult and wasting a lot of labor force in the prior art.

In order to achieve the above purpose, the invention provides a technical solution as follow.

Specifically, a tortoise electric slaughtering device includes an electric slaughtering box, an end of the electric slaughtering box is disposed with an outlet, a bottom wall of another end of the electric slaughtering box is disposed with a concave area, and a discharging plate is mounted at the outlet;

the electric slaughtering box is supported on a ground through a frame, a side of the electric slaughtering box and a side of the frame are connected through a mounting plate, and a bottom of the electric slaughtering box and an upper surface of the frame have a gap existed therebetween;

a driving wheel is rotatably disposed between side walls at one end of the electric slaughtering box, a driven wheel is rotatably mounted on an end of the frame away from the driving wheel, a pair of deflector rollers are mounted in a slope direction between side walls of the electric slaughtering box at the concave area, a guiding roller is mounted on a top of a side wall of the electric slaughtering box near the driven wheel; and the driving wheel, the guiding roller, the deflector rollers and the driven wheel are connected through a conveyer belt; and a clamping device is mounted on two side walls of the electric slaughtering box and configured (i.e., structured and arranged) to limit positionally a tortoise on the conveyer belt; and a cutting device is mounted on the clamping device and configured to cut the tortoise on the conveyer belt.

In some embodiments of the invention, an outer wall of the electric slaughtering box is disposed with an electric control meter.

In some embodiments of the invention, the clamping device includes two limiting plates, and each of the two limiting plates is connected to an inner wall of the electric slaughtering box adjacent thereto through a spring.

In some embodiments of the invention, the cutting device includes a pair of disc cutters and two electric motors, the two electric motors are fixedly mounted on the two limiting plates respectively, output shafts of the two electric motors are arranged oppositely, and each of the disc cutters is obliquely mounted on the output shaft of a corresponding one of the two electric motors through a cutter shaft. In actual production, a mounting distance between the disc cutter and the limiting plate is determined according to a position of the disc cutter cutting the tortoise, so as to avoid the distance is excessive, thereby prevent an excessive cutting of the disc cutter from damaging the body of the tortoise.

Based on the above tortoise electric slaughtering device, a preferred slaughtering method is provided and includes the following steps:

1) pouring an electrically-conductive liquid into the concave area of the electric slaughtering box, then putting a tortoise to be slaughtered into the electrically-conductive liquid, and turning on switches of the electric slaughtering box to set current and an electric shocking duration according to a weight of the tortoise to be slaughtered; a voltage of electric shocking to make the tortoise be unconscious is 35 volts (V), as per weight information of tortoise obtained by weighing, for a tortoise of 500 grams (g)-1000 g, the current of electric shocking to make the tortoise be unconscious is 20-30 milliamperes (mA), and the electric shocking duration is 5-6 seconds (s); for a tortoise of 1000 g-2000 g, the current of electric shocking to make the tortoise be unconscious is 30-40 mA, and the electric shocking duration is 7-8 s; for a tortoise of 2000 g-3000 g, the current of electric shocking to make the tortoise be unconscious is 40-50 mA, and the electric shocking duration is 9-10 s;

2) starting the conveyer belt to drive the tortoise after being unconscious by electric shocking to move towards the cutting device, limiting the tortoise after being unconscious by electric shocking through the limiting plates on the electric slaughtering box, continuing moving the tortoise until contacting with the disc cutters in rotating, cutting both side parts of upper and lower tortoise-shells by the disc cutters during moving the tortoise, and transferring out the tortoise after completion of the cutting from the conveyer belt along the discharging plate; and 3) manually shelling and cleaning the tortoise after completion of the cutting, and decomposing organs of the tortoise.

According to the above technical solutions, beneficial effects of the embodiments of the invention are at least as follows.

1. The device according to the invention is combined with the requirements of tortoise-shell glue production, and has characteristics of small occupied area, high automation degree, high efficiency, convenient operation, low cost and the like; and meanwhile In the process of cutting the shells after electric shocking the tortoise to be unconscious, internal structures of the tortoise is not damaged, internal organs are not damaged, and an application/use of the tortoise meat is not affected.

2. In addition, in some embodiments of the invention, the limiting plates are combined with the disc cutters, the limiting plates are elastically connected to the respective inner walls of the electric slaughtering box through spring, toughness of the limiting plates is adjustable, so that the requirement of limiting tortoises with different physiques can be met, and synchronous adjustment of cutting positions of the disc cutters is ensured while the positional limiting is adjusted.

Figure 1:
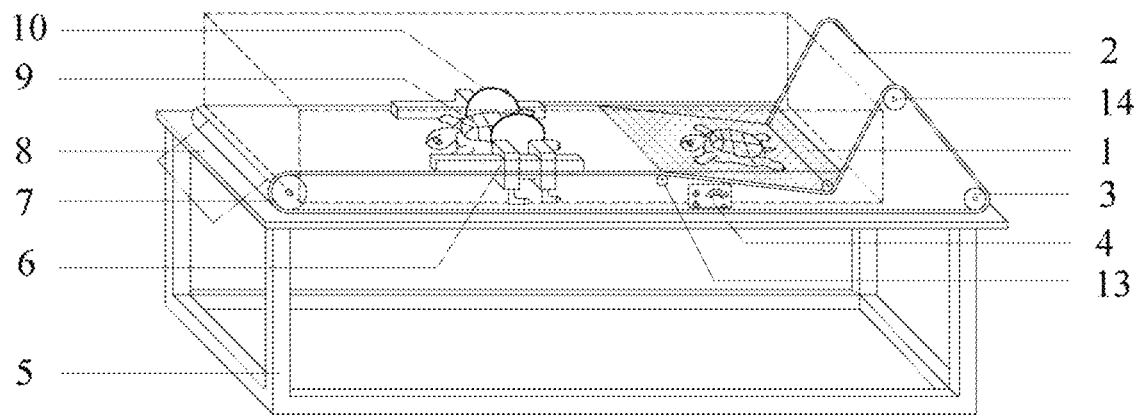
FIG. 1 illustrates a schematic structural view of a tortoise electric slaughtering device according to an embodiment of the invention.
Figure 2:
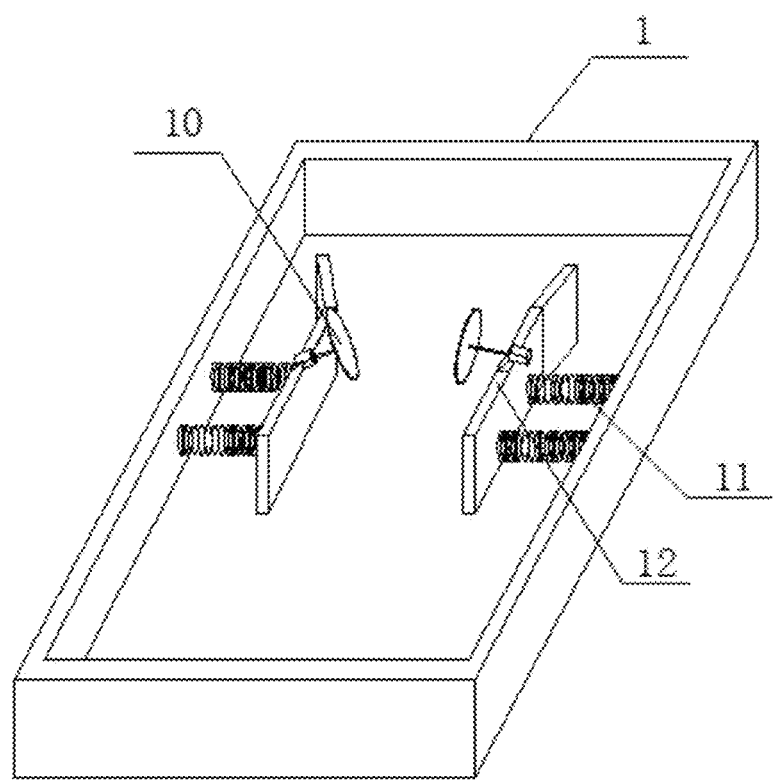
FIG. 2 illustrate a schematic structural view of an electric slaughtering box, a cutting device and a clamping device according to a preferred embodiment of the invention.

DESCRIPTION OF REFERENCE NUMERALS 1, electric slaughtering box; 2, conveyer belt; 3, driven wheel; 4, electric control meter; 5, frame; 6, clamping device; 7, driving wheel, 8, discharging plate; 9, tortoise; 10, disc cutter; 11, spring; 12, limiting plate; 13, deflector roller; 14, guiding roller; 15, electric motor.

DETAILED DESCRIPTION OF EMBODIMENTS

In order to make technical means, inventive features, objectives and effects of the invention be readily understood, the invention will be described in detail below in combination with specific embodiments.

Figure 3:
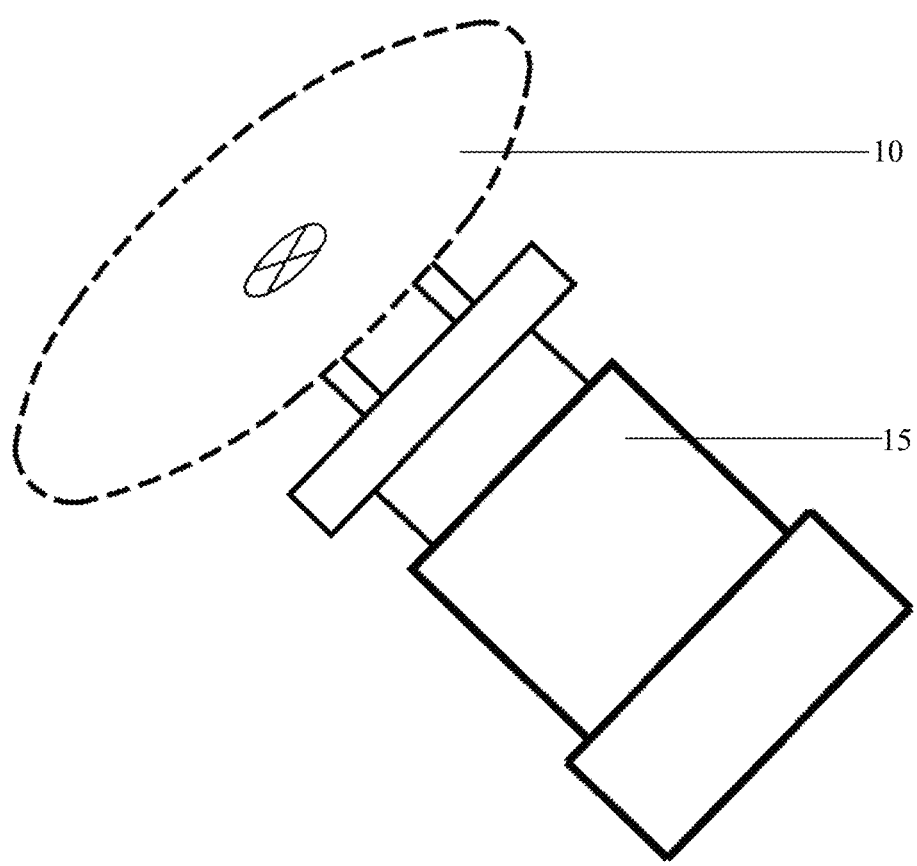
FIG. 3 illustrates a schematic enlarged partial view of the cutting device according to an embodiment of the invention.

In order to solve the problems that it is difficult to slaughter and requires more labor force because the tortoise-shells are hard, during the traditional manual slaughtering of tortoises; as illustrated in FIG. 1 and FIG. 3, a tortoise electric slaughtering device according to an embodiment of the invention includes an electric slaughtering box 1. An end of the electric slaughtering box 1 is disposed with an outlet, a bottom wall of another end of the electric slaughtering box 1 is disposed with a concave area for receiving electrically-conductive liquid, and a discharging plate 8 is mounted at the outlet. The electrically-conductive liquid can use tap water, which can meet an electrically-conductive requirement. The electric slaughtering box 1 is supported on the ground through a frame 5, and a side of the electric slaughtering box 1 and a side of the frame 5 are connected through a mounting plate. The mounting plate is located on the rear side in FIG. 1 and thus is not shown. A bottom of the electric slaughtering box 1 and an upper surface of the frame 5 have a gap existed therebetween. A driving wheel 7 is rotatably disposed between side walls at one end of the electric slaughtering box 1, a driven wheel 3 is rotatably mounted on an end of the frame 5 away from the driving wheel 7, a pair of deflector rollers 13 are mounted in a slope direction between side walls of the electric slaughtering box 1 at the concave area, a guiding roller 14 is mounted on a top of a side wall of the electric slaughtering box 1 near the driven wheel 3. The driving wheel 7, the guiding roller 14, the deflector rollers 13 and the driven wheel 3 are connected through a conveyer belt 2. A clamping device 6 is mounted on two side walls of the electric slaughtering box 1 and configured to limit positionally a tortoise on the conveyer belt 2. A cutting device is mounted on the clamping device 6 and configured to cut the tortoise on the conveyer belt 2.

In use, a certain amount of tap water is filled into the concave area of the electric slaughtering box 1, and then a tortoise 9 to be slaughtered is put into the tap water. Afterwards, the electric slaughtering box 1 is started to control current to electric shock the tortoise for a period of time until the tortoise is unconscious. At this time, the conveyer belt 2 is started to drive the unconscious tortoise 9 to approach the cutting device until both sides of the shells of the tortoise 9 are cut, and finally the cut tortoise 9 is discharged from the discharging plate 8. Compared with the traditional manual slaughtering, the electric slaughtering device has advantages that the automation degree is greatly increased, the operation is simpler and conforms to the spirit of animal welfare.

In some preferred embodiments of the invention, the clamping device 6 is designed to include two limiting plates 12, and each the limiting plate 12 is correspondingly connected to an inner wall of the electric slaughtering box 1 adjacent thereto. In order to optimize the limiting plates 12, ends of the respective limiting plates 12 facing towards the concave area extend obliquely in a manner of being away from each other, so that the two limiting plates 12 exhibit a Y shape after being combined together. In such way, the limiting range can be expanded. Each the limiting plate 12 may be made of an iron sheet.

In some embodiments, the cutting device includes a pair of disc cutters 10 and two electric motors 15, the two electric motors 15 are fixedly mounted on the two limiting plates 12 respectively, output shafts of the two electric motors 15 are arranged oppositely, each of the disc cutters 10 is obliquely mounted on the output shaft of a corresponding one of the two electric motors 15 through a cutter shaft, and the disc cutters 10 are located between the two limiting plates 12.

In another mounting manner, the disc cutters 10 are arranged between the two limiting plates 12, each the disc cutter 10 is connected to the corresponding limiting plate 12 through a cutter shaft, the electric motor is mounted on a side of the limiting plate 12 facing away from the disc cutter 10, one end of the cutter shaft passes through the limiting plate 12 and is fixedly connected with the output shaft of the electric motor. During mounting, the limiting plate 12 is formed with a mounting hole, a bearing is installed in the mounting hole, the cutter shaft is connected with the bearing in an interference fit manner, one end of the cutter shaft is fixedly connected with the corresponding disc cutter 10, and the other end of the cutter shaft is connected with the output shaft of the electric motor through a coupling. Moreover, in order to ensure the cutting effect, a disc cutter 10 with rectangular notches is used in production.

In an actual use: tap water is firstly poured into the concave area of the electric slaughtering box 1, a cleaned tortoise 9 is weighed, and then the tortoise is placed upside down in the tap water with its head facing forward, tail facing backward, belly facing up and back facing down. A voltage, current and a power-on duration are regulated through the electric control meter. For example, the voltage of electric shocking to make the tortoise be unconscious is 35 V, as per weight information of tortoise obtained by weighing, for a tortoise of 500 g-1000 g, the current of electric shocking to make the tortoise be unconscious is 20-30 mA, and the electric shocking duration is 5-6 s; for a tortoise of 1000 g-2000 g, the current of electric shocking to make the tortoise be unconscious is 30-40 mA, and the electric shocking duration is 7-8 s; for a tortoise of 2000 g-3000 g, the current of electric shocking to make the tortoise be unconscious is 40-50 mA, and the electric shocking duration is 9-10 s. The tortoise 9 by electric shocking to be unconscious is delivered towards the cutting device through the conveyer blet 2 and is clamped by the two limiting plates 12 of the clamping device 6, and then the disc cutters 10 on the limiting plates 12 respectively cut the joint of the carapace and the plastron of the tortoise from two sides, the tortoise after completion of cutting is delivered to the discharging plate 8. In actual production, a bottom of the discharging plate 8 is disposed with an operation platform, the discharged tortoise is taken out by manual operation, then is rinsed with clean water, and drained for 10 minutes (min), for later use. Afterwards, the corpus is removed from the tortoise shells, and then the tortoise-shells are rinsed with clean water and drained for 10 min. internal organs in the corpus of the tortoise 9 then are removed, and the gallbladder of the tortoise is picked out. The gallbladder of the tortoise is rinsed 3 times with 30° C. food grade purified water, and then drained for 10 min, for later use. Fats in armpits of four limbs of the corpus and in the visceral mass are picked out and collected, and scales and toes of the four limbs are removed to obtain tortoise meat. The tortoise meat is rinsed 3 times with 30° C. food grade purified water, and then drained for 10 min, for further use of the corpus of the tortoise.

From technical common sense, it can be seen that the invention can be embodied through other implementation schemes without departing from its spiritual essence or essential features. Therefore, the above disclosed embodiments are illustrative and not exclusive in all respects. All modifications within the scope of the invention or within the scope equivalent to the invention are included in invention.

What is claimed is:

1. A tortoise electric slaughtering device, comprising an electric slaughtering box (1), wherein an end of the electric slaughtering box (1) is disposed with an outlet, a bottom wall of another end of the electric slaughtering box (1) is disposed with a concave area, and a discharging plate (8) is mounted at the outlet;

wherein the electric slaughtering box (1) is supported on a ground through a frame (5), a side of the electric slaughtering box (1) and a side of the frame (5) are connected through a mounting plate, and a bottom of the electric slaughtering box (1) and an upper surface of the frame (5) have a gap existed therebetween;

wherein a driving wheel (7) is rotatably disposed between side walls at one end of the electric slaughtering box (1), a driven wheel (3) is rotatably mounted on an end of the frame (5) away from the driving wheel (7), a pair of deflector rollers (13) are mounted in a slope direction between side walls of the electric slaughtering box (1) at the concave area, a guiding roller (14) is mounted on a top of a side wall of the electric slaughtering box (1) near the driven wheel (3), and the driving wheel (7), the guiding roller (14), the deflector rollers (13) and the driven wheel (3) are connected through a conveyer belt (2);

wherein a clamping device (6) is mounted on two side walls of the electric slaughtering box (1) and configured to limit positionally a tortoise on the conveyer belt (2);

wherein a cutting device is mounted on the clamping device (6) and configured to cut the tortoise on the conveyer belt (2).

2. The tortoise electric slaughtering device as claimed claim 1, wherein an outer wall of the electric slaughtering box (1) is disposed with an electric control meter (4).

3. The tortoise electric slaughtering device as claimed claim 1, wherein the clamping device (6) comprises two limiting plates (12), and each of the two limiting plates (12) is connected to an inner wall of the electric slaughtering box (1) through a spring (11).

4. The tortoise electric slaughtering device as claimed in claim 3, wherein the cutting device comprises a pair of disc cutters (10) and two electric motors (15), the two electric motors (15) are fixedly mounted on the two limiting plates (12) respectively, output shafts of the two electric motors (15) are arranged oppositely, and each of the disc cutters (10) is obliquely mounted on the output shaft of a corresponding one of the two electric motors (15) through a cutter shaft.

5. A use method of the tortoise electric slaughtering device as claimed claim 4, comprising:

pouring an electrically-conductive liquid into the concave area of the electric slaughtering box (1), then putting a tortoise to be slaughtered into the electrically-conductive liquid, and turning on switches of the electric slaughtering box (1) to set current and an electric shocking duration according to a weight of the tortoise to be slaughtered;

starting the conveyer belt (2) to drive the tortoise after being unconscious by electric shocking to move towards the cutting device, limiting the tortoise after being unconscious by electric shocking through the limiting plates (12) on the electric slaughtering box (1), continuing moving the tortoise until contacting with the disc cutters (10) in rotating, cutting both side parts of upper and lower tortoise-shells by the disc cutters (10) during moving the tortoise, and transferring out the tortoise after completion of the cutting from the conveyer belt (2) along the discharging plate (8); and manually shelling and cleaning the tortoise after completion of the cutting, and removing a corpus of the tortoise.

6. A tortoise electric slaughtering device, comprising:

an electric slaughtering box (1), wherein a first end of the electric slaughtering box (1) is disposed with an outlet, and a bottom wall of a second end of the electric slaughtering box (1) opposite to the first end is disposed with a concave area;

a discharging plate (8), mounted at the outlet;

a frame (5), configured to support the electric slaughtering box (1) on a ground, wherein a bottom of the electric slaughtering box (1) and an upper surface of the frame (5) have a gap existed therebetween;

a driving wheel (7), rotatably disposed between side walls at the first end of the electric slaughtering box (1);

a driven wheel (3), rotatably mounted on an end of the frame (5) away from the driving wheel (7);

a pair of deflector rollers (13), mounted in a slope direction between side walls of the electric slaughtering box (1) at the concave area;

a guiding roller (14), mounted on a top of a side wall of the electric slaughtering box (1) near the driven wheel (3);

a conveyer belt (2), wherein the driving wheel (7), the guiding roller (14), the deflector rollers (13) and the driven wheel (3) are connected through the conveyer belt (2);

a pair of limiting plates (12), movably connected to opposite inner walls of the electric slaughtering box (1) respectively; and two electric motors (15), mounted on the pair of limiting plates (12) respectively, wherein output shafts of the two electric motors (15) are arranged oppositely; and a pair of disc cutters (10), mounted on the output shafts of the two electric motors (15) respectively.

7. The tortoise electric slaughtering device as claimed in claim 6, wherein ends of the respective limiting plates (12) facing towards the concave area extend obliquely in a manner of being away from each other.

8. The tortoise electric slaughtering device as claimed in claim 6, wherein an outer wall of the electric slaughtering box (1) is disposed with an electric control meter (4).

* * * * *